US006662524B2

(12) United States Patent
Annehed et al.

(10) Patent No.: US 6,662,524 B2
(45) Date of Patent: Dec. 16, 2003

(54) CLOSURE APPLICATOR WITH SWINGING ARM ANVIL

(75) Inventors: Stefan Annehed, Hamlake, MN (US); Hisami Mitsuishi, Blaine, IL (US); Peter Sevcik, Cambridge, MN (US)

(73) Assignee: Tetra Laval Holdings & Finance, SA, Pully (CH)

( * ) Notice: Subject to any disclaimer, the term of this patent is extended or adjusted under 35 U.S.C. 154(b) by 81 days.

(21) Appl. No.: 10/113,093

(22) Filed: Apr. 1, 2002

(65) Prior Publication Data

US 2003/0182897 A1 Oct. 2, 2003

(51) Int. Cl.[7] ................................................ B65B 61/18
(52) U.S. Cl. ...................... 53/133.2; 53/DIG. 2; 493/87
(58) Field of Search ............................ 53/133.2, 133.4, 53/DIG. 2; 493/87, 102, 213

(56) References Cited

U.S. PATENT DOCUMENTS 5,272,855 A * 12/1993 Togi et al. ................. 53/133.2
5,366,433 A * 11/1994 McCormick ................. 493/87
5,484,374 A * 1/1996 Bachner et al. ............ 53/133.2
5,601,669 A * 2/1997 Moody et al. .............. 493/213
5,653,832 A * 8/1997 Thompson et al. .......... 493/213
5,819,504 A * 10/1998 Giacomelli et al. ...... 53/DIG. 2
5,983,599 A * 11/1999 Krueger ..................... 53/133.2
6,079,185 A * 6/2000 Palaniappan et al. ...... 53/133.2

FOREIGN PATENT DOCUMENTS

EP 0426360 A1 * 5/1991

* cited by examiner

*Primary Examiner*—John Sipos
(74) *Attorney, Agent, or Firm*—Welsh & Katz, Ltd.

(57) ABSTRACT

An applicator is used for applying an associated closure to an interior surface of an associated carton in a form, fill and seal packaging machine. The associated closure has a flange that is sealed to the interior surface of the carton. The applicator includes a frame, a carriage mounted to the frame for longitudinal movement, a closure supply and an anvil mounted to the carriage for longitudinal movement with the carriage. The anvil is configured for securing the closure thereto for movement of the closure from the closure supply to the carton. The applicator further includes a longitudinal drive for longitudinally moving the anvil, a transverse drive for transversely moving the anvil and a sealing member. The closure is secured by the anvil and is transported on the anvil from the closure supply in a plane transcribed by the longitudinal and transverse drives into an interior portion of the carton. The closure is moved into contact with the interior surface, and the sealing member contacts an exterior surface of the carton corresponding to an area of contact of the closure at the interior surface to seas the closure to the carton.

20 Claims, 4 Drawing Sheets

40
54
38
26
64
52
58
36
56
28

34
66
44
70
48
50
60
62
68
32
72
31
42
30
46

54
58
64
36
52

56
66
70
68
72
32
31

54
58

56
64
70
68
72
32
31

54
58

56
64
70
68
72
32
31

CLOSURE APPLICATOR WITH SWINGING ARM ANVIL

BACKGROUND OF THE INVENTION

The present invention pertains to a closure applicator for applying closures to cartons in a form, fill and seal and packaging machine. More particularly, the present invention pertains to a closure applicator for use in a form, fill and seal packaging machine that utilizes a swinging arm and linkage for moving closures into position for applying to the carton.

Cartons are used in a wide variety of packaging applications. In the food packaging industry, form, fill and seal packaging machines have been used for decades to package food items such as milk, juice and soups for distribution to retail outlets such as grocery stores and the like.

One type of container for food packaging is the well-recognized gable top container. Such a container includes slanted gable panels that are sealed to one another at an upstanding top fin. Early containers required that the fin panels be separated from one another and the gable opened in order to access the product in the container.

Advances have been made in configurations for providing access to product in the containers. One such advancement has been in the use of plastic spouts attached to the container. Typically, such a spout has a flange that is integral with the upstanding spout and is referred to as a closure or fitment. The flange is welded or sealed to the container on an interior surface of the container at the gable panel. Typically, the flange is sealed at a periphery of an opening formed in the container. The spout extends from the flange, through the container material. A cap, such as a threaded closure can then be applied to the spout to provide resealable access to the container product.

In an effort to maintain high packaging line process speeds, closure applicators have been developed for picking a closure from a bulk supply of closures, transporting the closure into the interior of a (partially constructed, e.g., open-top) carton and moving the closure such that the spout extends though the opening in the carton and the flange is in contact with the interior portion of the carton immediately adjacent the opening. The closure (at the flange) is welded or sealed to the carton. Subsequent to application and sealing of the closure to the carton, the carton can be sterilized, filled and the top panels can be prefolded and folded and the fin seal established.

Many closure applicators include a series of complex movements, typically, arcuate or curved movements to take the closure from the bulk source of closures (or a transport or a dispensing arrangement from the bulk source) and moving the closure into the carton for subsequent sealing. An exemplary apparatus for applying fitments to a carton is disclosed in Giacomelli et al., U.S. Pat. No. 5,819,504, which patent is commonly assigned herewith and is incorporated herein by reference. Other applicators are also known. There are various drawbacks to these applicators, many of which required a nonlinear or arcuate movement of the closure into the carton. Such movement typically requires relatively complex assemblies and increases the amount of energy required for movement of the closures. Other applicators include star-wheels or other configurations that likewise require a combination of complex linear and rotational movements (and thus drives) to position the closures in the cartons for subsequent sealing.

Accordingly, there exists a need for a linear motion applicator for use in applying or moving closures into an interior portion of the carton for sealing thereto. Preferably, such a linear motion applicator is relatively simple in design. More desirably, such an applicator further uses a readily actuated linkage system for movement of the applicator for subsequent sealing to the carton.

BRIEF SUMMARY OF THE INVENTION

An applicator is used for applying an associated closure to an interior surface of an associated carton in a form, fill and seal packaging machine. An associated closure has a flange that is sealed to the interior surface of the carton.

The applicator includes a frame, a carriage mounted to the frame for longitudinal movement, a closure supply and an anvil mounted to the carriage for longitudinal movement with the carriage. The carriage moves between an inserted position (moving the anvil and closure into the container) and a withdrawn position (moving the anvil out of the container). The anvil is configured for securing the closure thereto as it moves the closure from the closure supply to the carton. The anvil can be mounted to an anvil arm.

The applicator further includes a longitudinal drive for longitudinally moving the anvil and a transverse drive for transversely moving the anvil. In a current embodiment, the drives are cylinders, such as pneumatic cylinders.

The applicator further includes a sealing member. In a current embodiment, the sealing member is an ultrasonic sealer.

The closure is secured by the anvil and transported on the anvil from the closure supply in a plane transcribed by the longitudinal and transverse drives. The closure (on the anvil) is moved into an interior portion of the carton and into contact with the interior surface of the carton. The sealing member contacts an exterior surface of the carton corresponding to an area of contact of the closure at the interior surface and seals the closure to the carton.

In a present embodiment, the anvil arm is pivotally mounted to a carriage and a linkage operably connects the transverse drive and the anvil. In this arrangement, the transverse drive is mounted to the carriage for longitudinal movement therewith.

The linkage can be configured having includes a duplex hinge, a first link operably connecting the carriage and the duplex hinge, and a second link operably connecting the duplex hinge and the anvil. In this arrangement, the transverse drive is operably connected to the duplex hinge to effect movement of the anvil between an extended position and a retracted position.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 2–5 illustrate the swinging arm anvil in a series of four positions through one cycle of the applicator in which FIG. 2 shows the anvil arm in a withdrawn-retracted position;

FIG. 3 shows the anvil arm in a withdrawn-extended position;

FIG. 4 shows the anvil arm in an inserted-retracted position; and

FIG. 5 shows the anvil arm in an inserted-extended position;

DETAILED DESCRIPTION OF THE INVENTION

Figure 1:
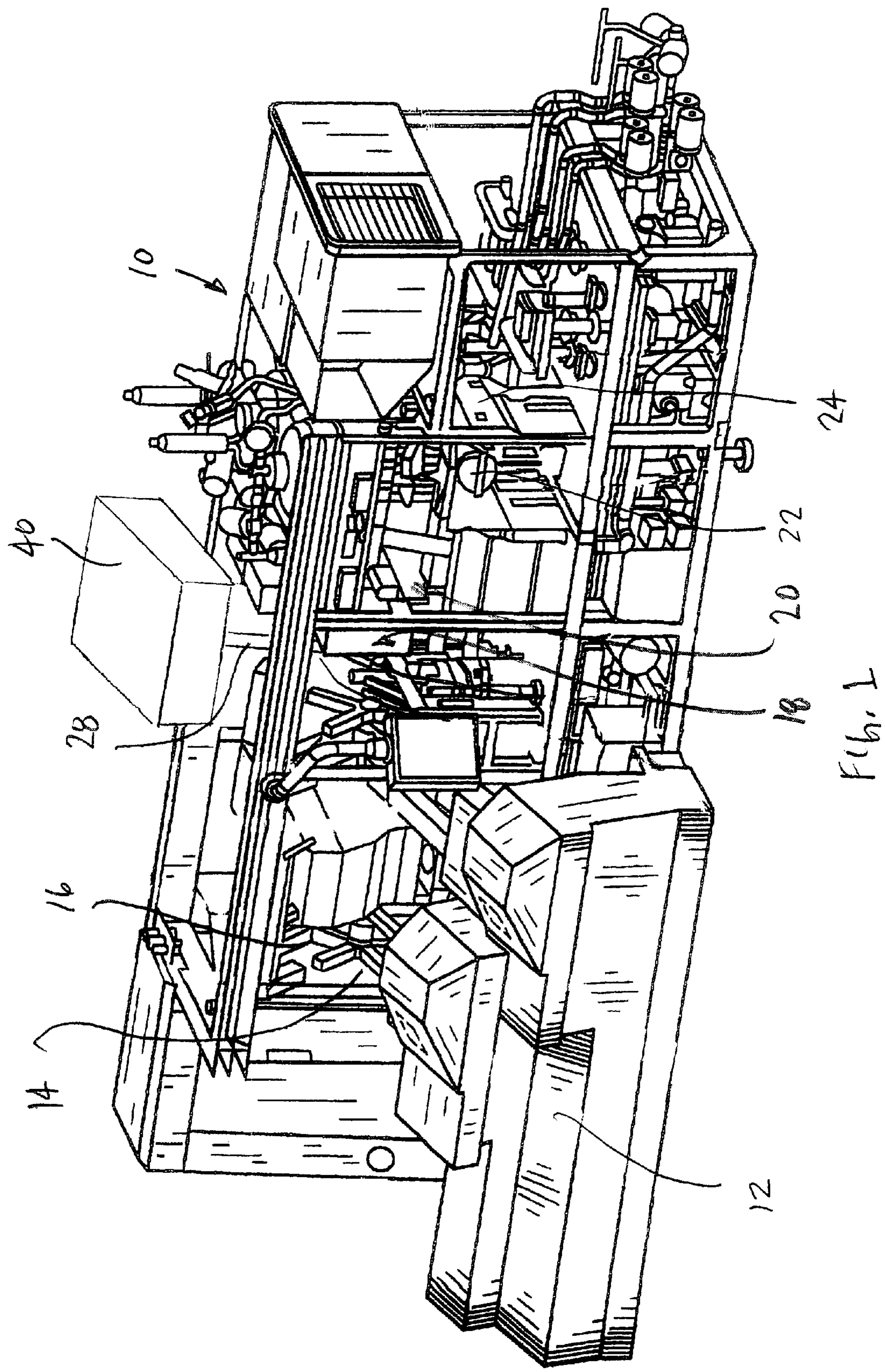
FIG. 1 illustrates an exemplary form, fill and seal packaging machine having an applicator with a swinging arm anvil embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

Referring now to the figures and in particular to FIG. 1, there is shown generally a form, fill and seal packaging machine 10. The machine 10 includes a plurality of stations for storing and supplying carton blanks, erecting a carton, sealing the bottom panels of the carton and applying a closure to an interior portion of the carton, adjacent one of the gable panels. These stations are commonly referred to as a carton magazine 12, a carton erection station 14, a bottom sealing station 16, and a closure application station 18.

Further, the machine can include one or more sterilization stations 20, a filling station 22 and a top sealing station 24. An exemplary form, fill and seal packaging machine is illustrated and disclosed in U.S. Pat. No. 6,012,267 to Katsumata, which patent is commonly assigned herewith and is incorporated herein by reference. The closure applicator 26 is typically positioned in the packaging machine 10 downstream of or after the carton erection and the bottom sealing stations 14, 16, and upstream of or prior to the filling station 22. Sterilization of the carton C which takes place at the sterilizations station(s) 20 can take place before or after application of the closure F, if desired.

Figure 6:
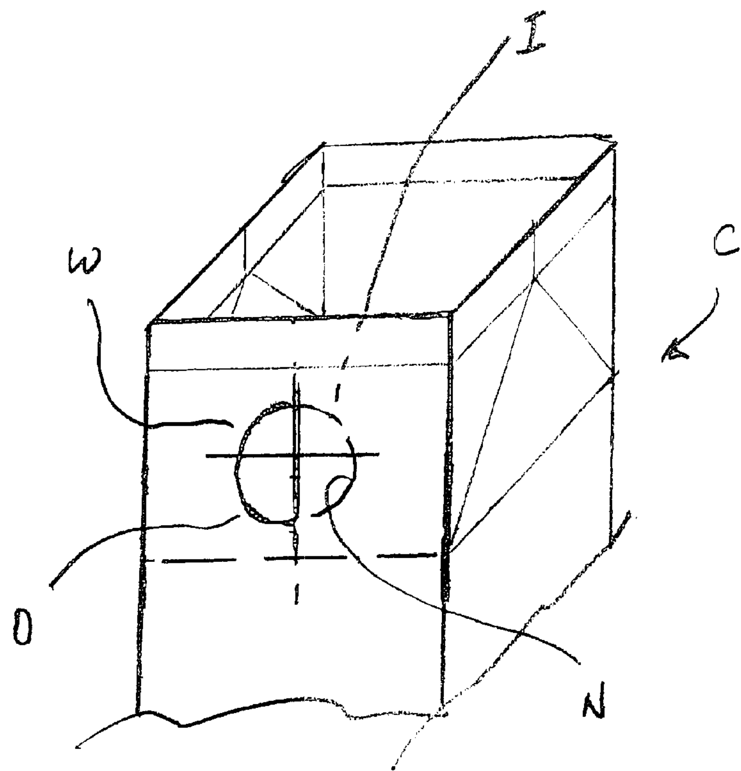
FIG. 6 illustrates an exemplary carton, partially constructed shown with upstanding top or gable panels and an open top.
Figure 7:
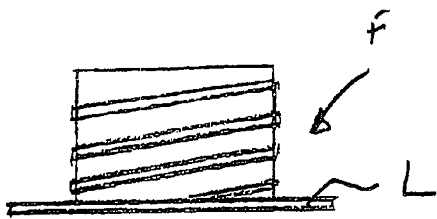
FIG. 7 illustrates an exemplary closure for use with the swinging arm anvil applicator.

The closure applicator 26 is configured to receive a closure or fitment F from a transport assembly 28, take the closure F from the transport assembly 28, and move the closure F into an interior portion of the carton C. The applicator 26 further moves the closure F into abutment with an interior surface I of the carton C, at which time a sealing member, such as the exemplary ultrasonic horn 30 moves into engagement with an outer surface O of the carton C at an area corresponding to that area of the carton C against which the closure flange L rests. The ultrasonic sealing member 30 is then actuated, the closure F is sealed to the carton C at the flange L and the ultrasonic sealing member 30, as well as an applicator anvil 32 are then moved out of engagement with the carton C and closure F, respectively. An exemplary open-top carton C, partially constructed, is illustrated in FIG. 6, while an exemplary closure F for use with the present applicator 26 is shown in FIG. 7.

Figure 2:
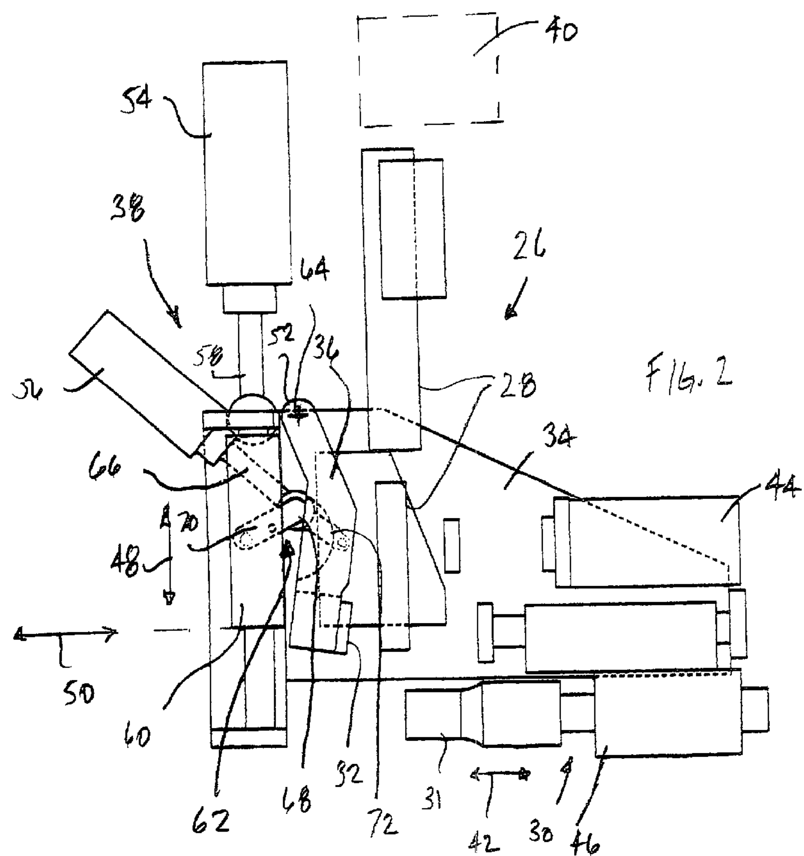

A present applicator 26 is illustrated in FIGS. 2 through 5. Referring to FIG. 2, the applicator 26 includes generally a frame 34, the sealer 30 such as the exemplary ultrasonic sealer (also referred to as an ultrasonic horn), an anvil arm 36 on which the anvil 32 is mounted, and a drive assembly 38. The applicator 26 cooperates with a closure supply 40 that supplies closures F to the applicator 26 via the transport assembly 28. The transport assembly 28 can be configured as a chute or like transport path through which the closures F move from the supply 40 to the applicator 26. An exemplary chute arrangement is disclosed in the aforementioned patent to Giacomelli et al.

The frame 34 is a stationary member affixed to a portion of the form, fill and seal packaging machine 10. The applicator 26 components are affixed to the frame 34 and are either stationary or configured for movement as will be discussed herein.

The sealer 30 typically includes a horn or other actuating member. The horn 31 is configured to move toward and away from a carton positioned in the applicator 26 as indicated by the double-headed arrow at 42. Typically, the horn 31 is driven by a cylinder 44 or like device. The exemplary sealer 30 also includes a converter that is used to impart ultrasonic vibrational movement to the horn 31 to effect sealing the closure F to the carton C.

The anvil arm 36 is configured for longitudinal movement or movement into and out of the open top of the carton C, as indicated by the double-headed arrow at 48, as well as transverse movement toward and away from the carton wall W, as indicated by the double-headed arrow at 50. In a present form, fill and seal packaging machine 10, longitudinal movement 48 is a vertical up and down movement, whereas transverse movement 50 is a generally horizontal movement. In the illustrated embodiment, the horn 31 moves in a direction 42 generally parallel to the transverse movement 50. Those skilled in the art will, however, recognize that the longitudinal movement 48 of the arm 36 may be in a horizontal plane (or at angles therebetween) and the transverse movement 50 in a vertical plane (or at angles therebetween), depending upon the approach and position of the carton C in the applicator 26, and that the direction of movement 42 of the horn 31 will likewise follow the transverse movement 50.

The anvil arm 36 includes the anvil or head portion 32 (also referred to as a spud) that is configured to engage and carry the closures F. That is, the anvil 32 is configured to engage or pick the closures F from the supply (or chute) 28 and secure the closures F thereto until the closure F is affixed or sealed to the carton C. The anvil arm 36 includes a shoulder portion 52 on an end opposite that of the anvil 32. The shoulder 52 is configured for pivotal movement to facilitate the transverse movement 48 of the anvil 32.

The drive assembly 38 is configured for providing longitudinal and transverse movement 48, 50 of the anvil arm 36. In a present embodiment, the drive assembly 38 includes a longitudinal cylinder 54 and a transverse cylinder 56. In the present embodiment, the longitudinal cylinder 54 provides longitudinal (or vertical) movement 48 to the anvil 32, whereas the transverse cylinder 56 provides transverse (or essentially horizontal) movement 50 to the anvil 32.

The longitudinal cylinder 54 is fixed relative to the frame 34 and includes a reciprocating rod 58. The rod 58 is connected to a carriage 60 that is movable on the frame 34. The carriage 60 carries the transverse cylinder 56, a linkage assembly 62 and a pivot 64 for the anvil arm 36. The pivot 64 is connected to the anvil arm 36 at about the shoulder 52. The carriage 60 reciprocates by extension and retraction of the longitudinal cylinder rod 58.

The transverse cylinder 56 is fixed relative to (e.g., mounted on) the carriage 60. The transverse cylinder 56 includes a reciprocating rod 66 that is connected to the linkage assembly 62 at a duplex hinge 68, and provides the drive or motive force for the hinge 68.

The linkage assembly 62 includes a first link member 70 that is pivotally mounted to the carriage 60 and to the duplex hinge 68. A second link member 72 is pivotally connected to the duplex hinge 68 and to the anvil arm 36. The transverse cylinder 56 (as effected by reciprocating movement of the rod 66) moves the hinge 68 between a retracted position and an extended position, independent of the movement or position of the longitudinal cylinder 54. The retracted and extended positions of the hinge 68 correspond to transverse movement 50 of the anvil arm 36 and thus the anvil 32.

Figure 4:
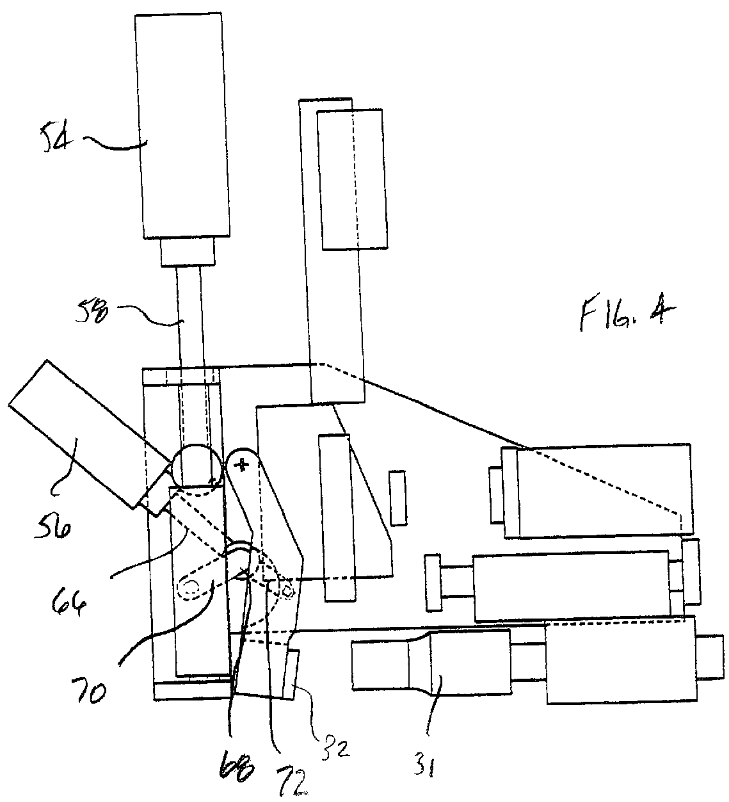
Figure 5:
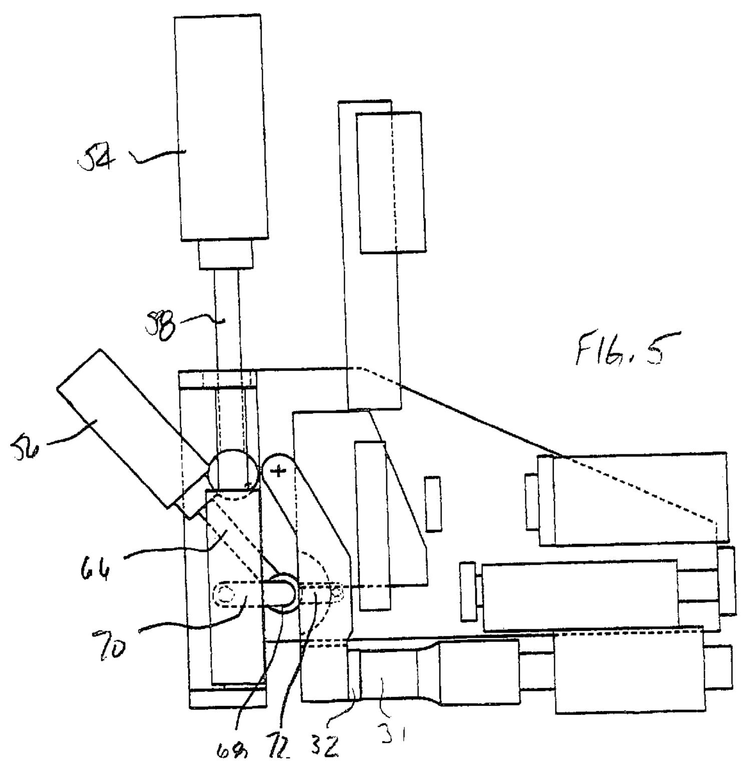

Operation of the applicator 26 will now be described with reference to FIGS. 2–5 which illustrate four discrete positions of the anvil 32, namely, a withdrawn-retracted position (FIG. 2), a withdrawn-extended position (FIG. 3), an inserted-retracted position (FIG. 4), and an inserted-extended position (FIG. 5). The applicator 26 moves or swings the anvil 32 and arm 36 (with the closure F secured on the anvil 32) though a plane transcribed by the movement (48, 50) of the longitudinal and transverse drives 54, 56, from the chute 28 to the interior of the carton C for sealing to the carton C. The drives or cylinders 54, 56 then reverse to bring the anvil 32 back to the chute 28 to "pick" a next subsequent closure F.

As will be understood from a study of the figures in conjunction with the present disclosure, the terms withdrawn and inserted refer to the longitudinal position or movement of the anvil 32 or anvil arm 36, and extended and retracted refer to the transverse movement of the anvil 32 or anvil arm 36.

In the withdrawn-retracted position (FIG. 2), the anvil 32 is positioned ready to engage or pick a closure F from the chute 28. At this point in time, a carton C can be removed from the applicator 26 and a subsequent or new carton can be positioned in the applicator 26. In addition, the sealing horn 31 is in a retracted position so as to not interfere with movement of a carton C into and out of the application station 18.

Figure 3:
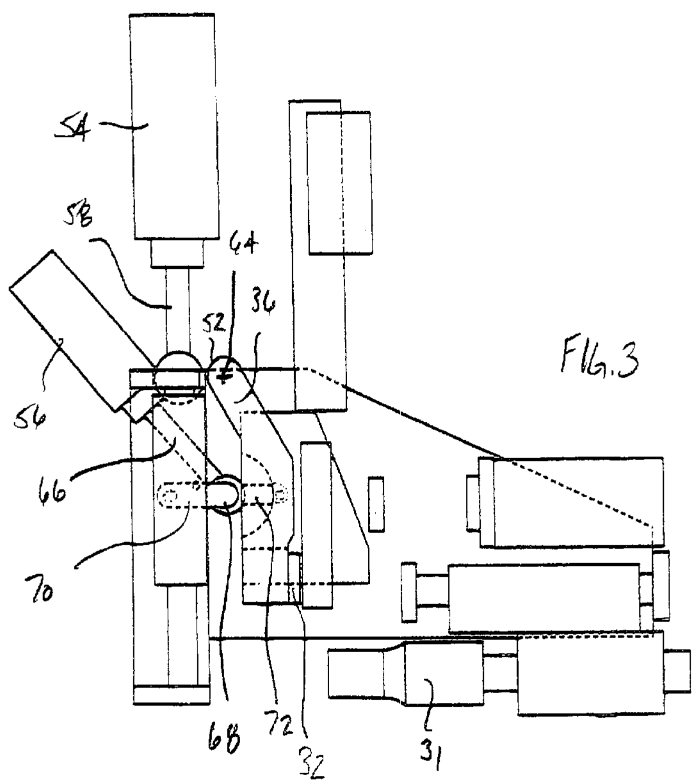

Referring now to FIG. 3, the transverse cylinder 56 actuates to extend the cylinder rod 66. This moves the duplex hinge 68 (and thus the anvil arm 36) into the withdrawn-extended position. In this position, the anvil 32 picks or engages a closure F from the chute 28. At this point in time, the sealing horn remains retracted to prevent interference with the carton C.

Referring now to FIG. 4, both the longitudinal and transverse cylinders 54, 56 are actuated. This moves the anvil arm 36 from the withdrawn-extended position to the inserted-retracted position. The transverse cylinder 56 is actuated reversing or retracting the rod 66, thus pulling the anvil 32 away from the transport or chute 28. The retracting movement of the anvil arm 36 also moves the closure F away from a path of the edge of the carton (which is positioned below in the applicator 26). During this same period of the cycle, the longitudinal cylinder 54 is actuated (extending the cylinder rod 58), to move the carriage 60 downwardly. Actuation of the longitudinal cylinder 54 (or downward movement of the carriage 60) moves the carriage 60 so that the anvil 32 is inserted into a carton C positioned in the applicator 26. During this period of the cycle the horn 31 remains retracted.

Referring now to FIG. 5, the transverse cylinder 56 is actuated to move the anvil arm 36 (and thus the anvil 32 with the closure F mounted thereto) into the inserted-extended position. This moves the closure F into position in the carton opening or hole N for sealing the closure F to the carton C. The sealing horn 31 moves into engagement with the carton C (exterior surface O) by means of actuation of the horn cylinder 44, contacting the carton surface O opposite of the closure flange L. Actuation of the horn 31 provides the ultrasonic energy (or other type of sealing function) necessary to seal the carton C and flange L to one another. The ultrasonic horn 31 then retracts while the anvil 32 is moved back to the withdrawn-retracted position, as illustrated in FIG. 2. This ends one cycle of the applicator 26.

Those skilled in the art will recognize that although the present applicator 26 is described having cylinders 54, 56 to effectuate longitudinal and transverse movement 48, 50 of the anvil 32, other arrangements can be used to provide effective and efficient movement of the anvil 32. For example, motors, such as servomotors or stepper motors can be used to provide this movement, as can other electromechanical arrangements, such as solenoids and the like, as well as indirect drives, such as belts, cams, gears and the like. All such drive arrangements are within the scope and spirit of the present invention.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An applicator for applying an associated closure to an interior surface of an associated carton in a form, fill and seal packaging machine, the closure having a flange that is sealed to the interior surface of the carton, the applicator comprising:

a frame;

a carriage mounted to the frame for longitudinal movement;

a closure supply;

an anvil mounted to the carriage for longitudinal movement with the carriage, the anvil configured for securing the closure thereto for movement of the closure from the closure supply to the carton;

a longitudinal drive for longitudinally moving the carriage;

a transverse drive mounted on said carriage for transversely moving the carriage; and a sealing member, wherein the closure is secured by the anvil and transported on the anvil from the closure supply in a plane transcribed by the longitudinal and transverse drives into an interior portion of the carton and moved into contact with the interior surface, and wherein the sealing member contacts an exterior surface of the carton corresponding to an area of contact of the closure at the interior surface and seals the closure to the carton.

2. The applicator in accordance with claim 1 including a linkage operably connecting the transverse drive and the anvil.

3. The applicator in accordance with claim 1 wherein the anvil is mounted to an anvil arm, the anvil arm being pivotally mounted to the carriage.

4. The applicator in accordance with claim 1 wherein the transverse drive is mounted to the carriage for longitudinal movement therewith.

5. The applicator in accordance with claim 1 including a linkage operably connecting the transverse drive and the anvil.

6. The applicator in accordance with claim 1 wherein the longitudinal drive is a cylinder.

7. The applicator in accordance with claim 1 wherein the transverse drive is a cylinder.

8. The applicator in accordance with claim 2 wherein the linkage includes a duplex hinge, a first link operably connecting the carriage and the duplex hinge, and a second link operably connecting the duplex hinge and the anvil, and wherein the transverse drive is operably connected to the duplex hinge to effect movement of the anvil between an extended position and a retracted position.

9. The applicator in accordance with claim 1 including a drive operably connected to the sealing member for moving the sealing member in a direction generally parallel to a direction of the transverse drive.

10. An applicator for applying an associated closure to an interior surface of an associated carton in a form, fill and seal packaging machine, the closure having a flange that is sealed to the interior surface of the carton, the applicator comprising:

a frame;

a carriage mounted to the frame for longitudinal movement;

a closure supply;

an anvil mounted to the carriage for longitudinal movement with the carriage, the anvil configured for securing the closure thereto for movement of the closure from the closure supply to the carton;

a longitudinal drive mounted to the frame for longitudinally moving the carriage;

a transverse drive mounted to the carriage;

a linkage assembly operably connected to the anvil and to the transverse drive for imparting transverse movement the anvil; and a sealing member, wherein the closure is secured by the anvil and transported on the anvil from the closure supply in a plane transcribed by the longitudinal and transverse drives into an interior portion of the carton and moved into contact with the interior surface, and wherein the sealing member contacts an exterior surface of the carton corresponding to an area of contact of the closure at the interior surface and seals the closure to the carton.

11. The applicator in accordance with claim 10 wherein the longitudinal and transverse drives are direct drives.

12. The applicator in accordance with claim 11 wherein the direct drives are cylinders.

13. The applicator in accordance with claim 10 wherein the linkage assembly includes first and second link members and a hinge member between the first and second link members, the transverse drive being operably connected to the linkage assembly at the hinge member.

14. The applicator in accordance with claim 10 including a drive operably connected to the sealing member.

15. An applicator for applying an associated closure to an interior surface of an associated carton in a form, fill and seal packaging machine, the closure having a flange that is sealed to the interior surface of the carton, the applicator comprising:

a frame;

a carriage mounted to the frame for longitudinal movement;

a closure supply;

an anvil mounted to the carriage for longitudinal movement with the carriage, the anvil configured for securing the closure thereto for movement of the closure from the closure supply to the carton;

means for longitudinally moving the anvil;

means for transversely moving the anvil; and a sealing member, wherein the closure is secured by the anvil and transported on the anvil from the closure supply in a plane transcribed by the means for longitudinally moving the anvil an the means for transversely moving the anvil into an interior portion of the carton and moved into contact with the interior surface, and wherein the sealing member contacts an exterior surface of the carton corresponding to an area of contact of the closure at the interior surface and seals the closure to the carton.

16. The applicator in accordance with claim 15 wherein the means for transversely moving the anvil includes a transverse drive, and wherein the applicator further includes means for connecting the transverse drive and the anvil.

17. The applicator in accordance with claim 15 including means for moving the sealing member.

18. The applicator in accordance with claim 17 wherein the means for moving the sealing member includes a drive mounted to the frame.

19. The applicator in accordance with claim 16 including a sealing member drive for moving the sealing member in a direction generally parallel to a direction of movement of the transverse drive.

20. The applicator in accordance with claim 17 wherein the means for moving the sealing member is a cylinder.

* * * * *

UNITED STATES PATENT AND TRADEMARK OFFICE

CERTIFICATE OF CORRECTION

PATENT NO. : 6,662,524 B2
DATED : December 16, 2003
INVENTOR(S) : Annehed et al.

It is certified that error appears in the above-identified patent and that said Letters Patent is hereby corrected as shown below:

Title page,
Item [75], Inventors, 2nd inventor should read -- Hisami Mitsuishi, Blaine, MN (US) --

Signed and Sealed this

Thirteenth Day of April, 2004

JON W. DUDAS
*Acting Director of the United States Patent and Trademark Office*